United States Patent

[11] 3,582,974

[72] Inventors David L. Favin
 Little Silver;
 Peter F. Lynn, Red Bank, both of N.J.
[21] Appl. No. 771,724
[22] Filed Oct. 30, 1968
[45] Patented June 1, 1971
[73] Assignee Bell Telephone Laboratories, Incorporated
 Murray Hill, Berkeley Heights, N.J.

[54] CIRCUIT TO ANALYZE A SIGNAL AMPLITUDE
 RANGE THROUGH FREQUENCY
 DISCRIMINATION TECHNIQUES
 7 Claims, 4 Drawing Figs.
[52] U.S. Cl. .................................................. 307/235,
 307/233, 328/115, 328/150
[51] Int. Cl. ...................................................... H03k 5/20
[50] Field of Search ............................................ 307/233,
 235; 328/115, 135, 150

[56] References Cited
 UNITED STATES PATENTS
 2,434,937 1/1948 Labin et al. ................. 328/115X
 2,820,896 1/1958 Russell et al. ................ 328/116

Primary Examiner—John S. Heyman
Assistant Examiner—John Zazworsky
Attorneys—R. J. Guenther and E. W. Adams, Jr.

ABSTRACT: A signal amplitude analyzer quantizes discrete peak amplitude ranges of periodic signals into discrete frequencies by responding to the entry into and exit from these discrete ranges by the periodic signals. Indicating apparatus responsive to these discrete frequencies conveys information concerning the peak amplitude range of the periodic signals.

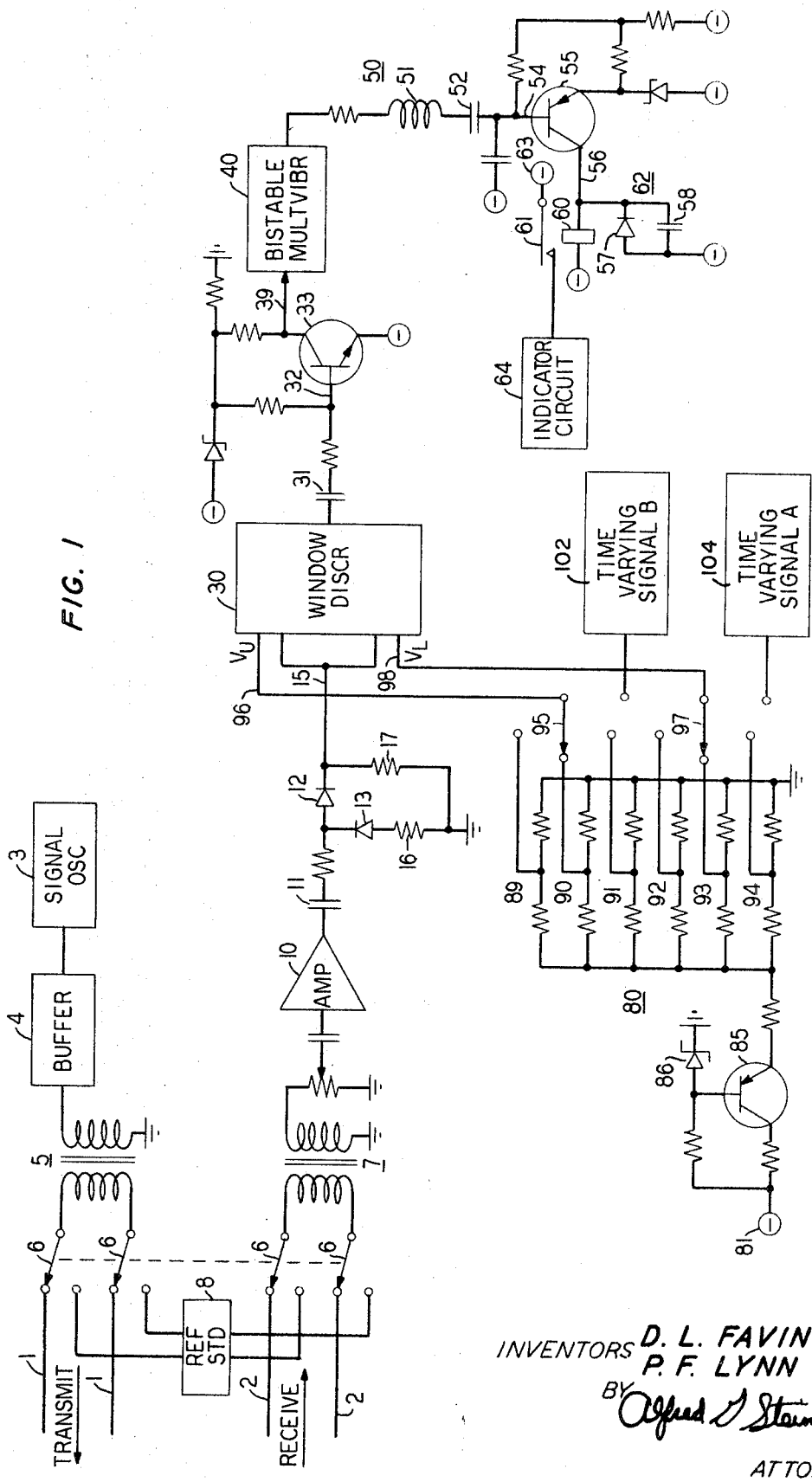

3,582,974

CIRCUIT TO ANALYZE A SIGNAL AMPLITUDE RANGE THROUGH FREQUENCY DISCRIMINATION TECHNIQUES

FIELD OF THE INVENTION

This invention relates to signal amplitude analyzers and, more particularly, to a signal amplitude analyzer to monitor the peak amplitude range of periodic signals.

BACKGROUND OF THE INVENTION

In the testing of the fidelity of transmission facilities it is customary to inject a periodic test signal at one terminal of the facility and to recover this test signal at the other terminal. The returned test signal is compared with the known characteristics of the transmitted test signal to determine the fidelity of the transmission facility. One facet of the performance of the transmission facility may be accurately tested by examining the returning test signal for amplitude attenuation. This test may be performed with a signal amplitude analyzer.

The signal amplitude analyzer montors the periodic test signal to determine if its peak amplitude deviates from a specified range of permissible amplitudes. This amplitude range is defined by specified lower and upper amplitude boundaries. These amplitude boundaries define a window. If the peak amplitude of the signal is within the window the analyzer responds by indicating the acceptability of the signal; if the peak amplitude of the signal is outside the window the analyzer responds by indicating the unacceptability of the signal.

A typical amplitude analyzer arrangement to monitor an amplitude range responds to a signal amplitude as follows. When the signal crosses the lower amplitude boundary the analyzer generates an output signal to indicate that the signal amplitude is greater than this lower amplitude boundary. If the signal amplitude exceeds the upper amplitude boundary this output signal is suppressed. Hence, the output signal appears only when the amplitude of the test signal is within the amplitude range defined by the window.

If periodic signals are applied to such an analyzer as described above the output signal will fluctuate on and off as the signal amplitude enters and leaves the window. The output signal in this form is not satisfactory to indicate the peak amplitude range of a periodic signal. Hence, in this type analyzer arrangement the periodic signal is rectified before application to the analyzer in order to permit it to generate an output signal of more useful form to monitor the periodic signal amplitude. Such rectification of the periodic signal is undesirable because the analyzer responds to random signal noise and the resultant voltage ripple of the rectified periodic signal adversely affects the threshold accuracy at the input of the analyzer. Additionally, by using these DC signals, inaccuracies are introduced into the analyzer by voltage drift and temperature introduced instabilities of the components of the analyzer.

An alternative to the aforedescribed signal amplitude analyzer arrangement simultaneously monitors a periodic signal with two paralleled amplitude threshold detectors set at different threshold levels. The output of each amplitude detector is independently coupled to its own counter. The transitions of the signal across the thresholds of the detectors are counted by the respective counters. The average amplitude range of the periodic signal, as compared to the range of the window defined by the two threshold detectors, is represented by the difference between the counts in the two counters. While this particular analyzer arrangement has an improved output signal for analyzing periodic signals, the analyzer is still responsive to random signal noise which may falsely trigger the threshold detectors. Additionally, the resultant output signal only indicates the amplitude range of the average signal for the particular predetermined counting period. Hence, a periodic signal may deviate for short periods of time from the amplitude range defined by the window without this deviation being indicated by the amplitude analyzer.

Therefore, it is an object of the present invention to analyze the amplitude range of periodic signals without responding to the amplitude of random signal noise.

It is another object of the invention to continuously analyze the amplitude of a periodic signal to detect deviations of short duration from a defined amplitude range.

SUMMARY OF THE INVENTION

Therefore, in accord with the present invention, a signal amplitude analyzer analyzes the peak amplitude of a periodic signal with respect to a specified amplitude range by quantizing the signal amplitude into different signal frequencies, depending upon the presence of the peak amplitude of the signal within or without the specified amplitude range. A subsequent detector circuit utilizes frequency discrimination techniques to recognize the existence of the peak amplitude of the signal within the specified amplitude range.

The periodic signal whose peak amplitude is to be analyzed is applied to a window amplitude discriminator which is responsive to a particular amplitude range or window of the applied periodic signal. The window discriminator comprises two signal level detectors; one detector is set to the upper boundary of the amplitude range and the other detector is set to the lower boundary. The window discriminator generates an output signal at one level when the amplitude of the periodic signal is within the amplitude range and an output signal at another level when the periodic signal amplitude is not within the amplitude range. The transitions in signal level of the output of the window discriminator are utilized to switch a bistable multivibrator. The output of the multivibrator is applied to a frequency sensitive detector circuit. When the peak amplitude of the periodic signal is within the amplitude range specified by the window, the output of the multivibrator has a particular fundamental frequency. The detector circuit responds to this particular frequency and hence, indicates that the peak amplitude of the periodic signal is within the specified amplitude range or window.

A feature of the circuit of the invention is its built-in immunity to random signal noise. The circuit is responsive only to a periodic signal of a specified frequency. This immunity to random signal noise is due to the frequency quantization of the signal amplitude into a frequency which is responsive to the frequency as well as the amplitude of the periodic signal being monitored.

BRIEF DESCRIPTION OF THE DRAWINGS

Other objects and advantages of the invention will be apparent upon a study of the following specification in conjunction with the accompanying drawings in which:

FIG. 1 is a schematic diagram partially in block form of one embodiment of the invention.

DETAILED DESCRIPTION

Figure 2A:
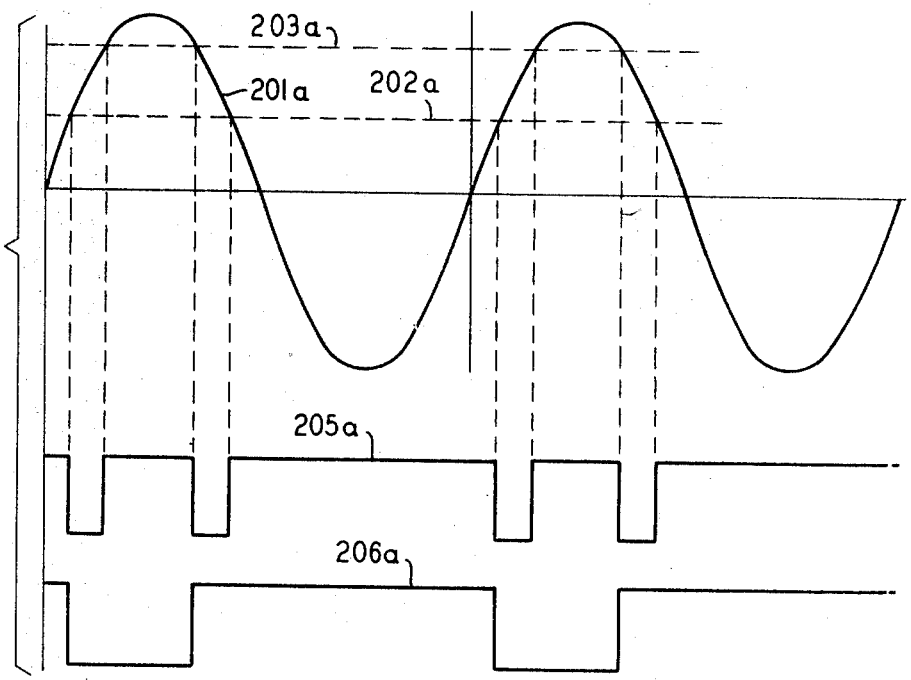
FIGS. 2A, 2B, 2C illustrate the typical waveforms of periodic signals being analyzed and the response of the analyzing apparatus to the periodic signals.

The signal amplitude analyzer disclosed in FIG. 1 amplifies the periodic signal being analyzed with an amplifier 10 and applies it to a window amplitude discriminator 30. The output signal of the window discriminator 30 is at one defined signal level when the amplitude of the periodic signal being analyzed is within the window. If the amplitude of the periodic signal is not within the window, the output of the window discriminator 30 is at another defined signal level. The transitions in the signal level of the output of the window discriminator 30 from the one level to the other level are utilized to switch a bistable multivibrator 40. The output of the bistable multivibrator 40 is applied to the filter 50 which transmits only a particular frequency to a detector relay coil 60. The particular frequency is that fundamental frequency which is generated by the multivibrator 40 if the peak signal amplitude of the periodic signal is within the amplitude range defined by the window.

The signal analyzer shown in FIG. 1 is connected to the transmit terminals 1 and the receive terminals 2 of a transmission facility to be tested. The transmission facility may comprise any electrical transmission medium whose fidelity is to be evaluated by the signal analyzer. A test signal oscillator 3 is coupled by the buffer amplifier 4, a coupling transformer 5, and a gang switch 6 to the transmit terminals 1. The oscillator 3 preferably generates a periodic sine wave test signal. The power level of the test signal is adjustable to accommodate various types and distances of transmission facilities. This periodic test signal is transmitted, via the transmission facility, the receive terminals 2, and the coupling transformer 7 to the input amplifier 10 of the signal analyzer.

A reference transmission standard 8 may be substituted for the transmission facility by switching the gang switch 6 to the other position from that shown in FIG. 1. The reference standard 8 provides a calibrated transmission path for the purposes of calibrating the signal analyzer.

The periodic signal being analyzed is amplified by the input amplifier 10 to match the input requirements of the subsequent window discriminator 30. The amplifier 10 is a fixed gain alternating current amplifier. The alternating current test signal output of the amplifier 10 is applied, via the DC blocking capacitor 11, to the input circuitry of the window discriminator 30. The input circuitry includes the protection diodes 12 and 13, the bias resistor 17, the resistor 16 and the input terminal 15. The protection diodes 12 and 13 prevent the portions of the periodic test signal which are opposite the polarity of the signals for which the window is designed from exceeding a potential value which could possibly damage the components of the window discriminator 30. The resistor 16 is chosen to maintain a constant input impedance for both the positive and negative portions of the test signal.

The window discriminator 30 may comprise a dual differential voltage comparator which includes two independent pulse height detectors each responsive to a different threshold voltage. Window discriminators are will known in the art and it is not believed necessary to describe it in detail. The amplitude range defined by the upper and lower values of these two threshold voltages comprises the window. The periodic signal being analyzed is applied to both inputs simultaneously. If the amplitude of the periodic signal is between the upper and lower thresholds the window discriminator 30 produces a signal output at one defined signal level. If the amplitude of the periodic signal is above the upper threshold or below the lower threshold, the output of the window discriminator 30 is a signal output at another defined signal level which may be of an opposite polarity to the one signal level.

The upper and lower threshold voltage levels defining the window are established by a bias control arrangement 80. The bias control arrangement 80 comprises a voltage source including a negative potential 81, a transistor 85, and a Zener diode 86. The transistor 85 is biased into conduction by the Zener diode 86 and transmits the negative potential 81, via the collector emitter path of the transistor 85, to a plurality of voltage dividers 89—94. Each of the voltage dividers 89—94 has a different voltage division ratio. The voltage dividers are connected to the bias inputs 96 and 98 of the window discriminator 30, via the switches 95 and 97, in order to adjust the proper threshold settings therein. While only three dividers are illustrated for each threshold setting, many additional voltage dividers may be readily added thereto. The switches 95 and 97 may also be connected to the time varying signal sources 102 and 104, respectively. The time varying signal sources 102 and 104 supply the time varying signals A and B that independently vary the upper and lower threshold levels with respect to time. Threshold levels that vary in time are useful in situations where the amplitude range of the signal to be monitored is to change with respect to time.

Figure 2B:
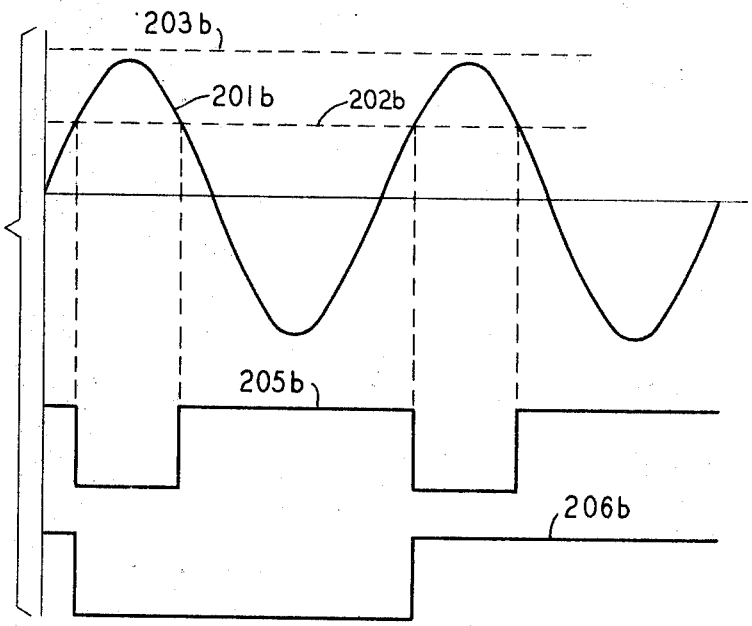
Figure 2C:
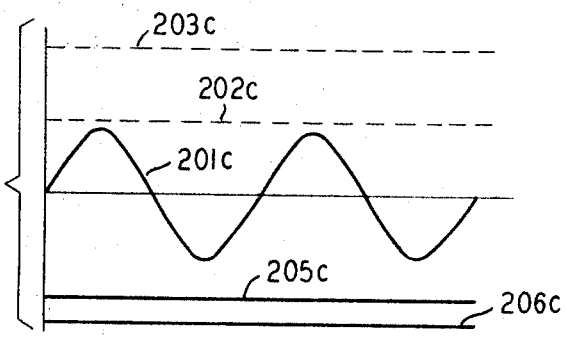

The aforedescribed signal response by the window discriminator 30 is shown by reference to FIG. 2. FIG. 2 shows the periodic signals 201a, 201b and 201c being analyzed and the response of the window discriminator 30 to the various amplitudes of these signals. In FIG. 2B, for instance, where the peak amplitude of the periodic signal 201b is within the window defined by the two threshold levels 202b and 203b of the window discriminator 30, the transitions of the signal output 205b of the window discriminator 30 from one signal level to another signal level coincide with the periodic signals's entry into and exit from the window. The output signal of the window discriminator 30 has a positively oriented signal level when the periodic signal amplitude is outside the window defined by the threshold limits. Its signal output has a negatively oriented signal level when the amplitude of the periodic signal is within the window. The same signal response of the window discriminator 30 to periodic signals whose peak amplitude is outside the window is illustrated by the discriminator output waveforms 205a and 205c, as illustrated in FIGS. 2A and 2C, respectively.

The output of the window discriminator 30 is transmitted, via the blocking capacitor 31, to the base electrode 32 of the transistor 33. The transistor 33 acts as a buffering stage to match the signal output of the window discriminator 30 to the input 39 of the bistable multivibrator 40. The bistable multivibrator 40 responds to the signal output of the window discriminator 30 by changing state every time this signal output applied to the input 39 undergoes a negative transition. The response of the multivibrator 40 to the signal output of the window discriminator 30 may be more readily apprehended by reference to FIGS. 2A and 2B where the waveforms 206a and 206b represent the multivibrator response to the signal outputs 205a and 205b of the window discriminator 30, respectively. When the signal output of the discriminator 30 does not have a negative transition the multivibrator 40 does not change state, as is shown by waveform 206c in FIG. 2C.

It is apparent from inspection of FIGS. 2A, 2B and 2C that the output of the multivibrator 40 is a square- wave signal whose duty cycle and repetition rate are dependent upon the peak amplitude and frequency of the periodic signal being analyzed. The repetition rate of the square wave signal is one-half the frequency of the periodic signal when its peak amplitude is within the window. At this repetition rate the duty cycle of the square wave is approximately one-half the total cycle and its fundamental frequency is approximately one-half the frequency of the periodic signal. When the peak amplitude of the periodic signal is above the window, the repetition rate of the square wave signal is equal to the frequency of the periodic signal. When the peak amplitude of the periodic signal is below the window, the output of the multivibrator 40 is a constant. Hence, it is apparent that the repetition rate of the square wave output of the multivibrator 40 is a quantized representation of the peak amplitude and frequency of the periodic signal being analyzed.

The signal output of the multivibrator 40 is applied to a filter 50 comprising the inductor coil 51 and the capacitor 52. The resonant frequency of the band-pass filter 50 is designed to be exactly one-half the frequency of the periodic test signal applied to the analyzer. When the peak amplitude of the periodic signal being analyzed is within the window, the fundamental frequency of the square wave output of the multivibrator 40 is equal to the resonant frequency of the filter 50. This signal transmitted by the filter 50 is applied to the control electrode 54 of the transistor 55. The transistor 55 is biased in a normally OFF condition. The positive cycles of the signal transmitted by the filter 50 bias the transistor 55 into a conducting condition.

When the peak amplitude of the periodic signal is not within the window, the fundamental frequency of the output of the multivibrator 40 is outside the passband of the filter 50. Hence, only a highly attenuated signal is transmitted by the filter 50 which is not sufficient to bias the transistor 55 into conduction. It is apparent from the foregoing that the analyzer has immunity to noise signals of frequencies different from that of the periodic signal. The amplitude of signals at frequencies other than the periodic signal being analyzed will be quantized into frequencies which are not transmitted by the filter 50.

A relay coil 60 is connected to the collector 56 of the common emitter connected transistor 55. When the transistor 55 is biased into conduction by the signal transmitted by the filter 50, the transmitted signal on collector 56 is applied to the relay coil 60, via the circuit 62 including diode 57 and the capacitor 58. This signal energizes the relay coil 60. The energized relay coil 60 operates the relay armature 61. The operated relay armature 61 connects the energy source 63 to an indicator circuit 64 which may comprise a meter to inform the tester that the peak amplitude of the periodic signal is within the operating tolerance defined by the window.

While the invention has been described in terms of a particular embodiment, many variations therein may be implemented without departing from the spirit and scope of the invention. While certain operations of the invention have been described using certain signal waveforms and polarities, the invention is in no way intended to be limited to these particular examples. For example, the invention will respond to monitor the amplitude of nonperiodic signal envelopes of bursts of periodic signals or continuous periodic signals.

What I claim is:

1. A signal amplitude range analyzer comprising, a source of periodic signals whose peak amplitude range is to be monitored, window discrimination means defining a window bound by an upper and lower amplitude threshold and coupled to said source of periodic signals, means responsive to said window discrimination means to quantize the transition of the amplitude of said periodic signal into and out of said window into discrete frequencies and frequency discriminator means responsive to the particular frequency quantizing the amplitude range defined by said window.

2. A signal amplitude range analyzer as claimed in claim 1 wherein said window discrimination means generates an output signal of one level when the amplitude of said periodic signal is outside said window and a different level output signal when the amplitude of said periodic signal is within said window and said means to quantize comprises a switching means responsive to unidirectional transitions in the signal level of the output signal of said window discriminator.

3. A signal amplitude range analyzer as claimed in claim 2 wherein said frequency discriminator means comprises a filter responsive to a frequency one-half the fundamental frequency of said periodic signal.

4. A signal amplitude range detecting circuit comprising a source of periodic signals whose peak amplitude within a certain amplitude range is to be monitored, window discrimination means coupled to said source of periodic, signals comprising, means to detect a first signal level, means to detect a second signal level greater than said first signal level, said first and second signal levels defining said amplitude range, said window discrimination means selectively generating one of two states of an output signal and changing the state of said output signal whenever the amplitude of said periodic signal enters or leaves said certain amplitude range, a bistable circuit means coupled to said window discrimination means and responsive to the changing state of the signal output of said window discrimination means, said response by said bistable circuit means to said changing state of said signal output when said peak amplitude exceeds said first signal level but is less than said second signal level producing a pulse output with a particular fundamental frequency and signal detection means to discriminate between the various output frequencies of said bistable circuit means.

5. A signal amplitude range detecting circuit as claimed in claim 4 wherein said signal detection means to discriminate comprises a band-pass filter resonant to a frequency one-half the frequency of said periodic signal, and means responsive to the signal transmitted by said filter to operate indicator means.

6. A signal amplitude range detecting circuit as claimed in claim 5 further including means to adjust the amplitude of said first and second signal levels, said means to adjust including means to vary the bias signal applied to said window discrimination means.

7. A signal amplitude analyzer comprising a signal amplitude discriminator responsive to an upper and lower amplitude threshold level, bistable switching means responsive to said signal amplitude discriminator, said bistable switching means changing its signal level output when a signal applied to said amplitude discriminator crosses said upper and lower threshold level, and indicator means responsive to a particular switching frequency of said bistable switching means, said particular switching frequency occurring at a signal amplitude which is within the upper and lower amplitude threshold level.